United States Patent [19]

Gocho

[11] 4,131,829
[45] Dec. 26, 1978

[54] ELECTRIC POWER CONVERTING APPARATUS FOR USE IN BATTERY CARS

[75] Inventor: Choichi Gocho, Tokyo, Japan

[73] Assignee: Tokyo Shibaura Denki K.K., Japan

[21] Appl. No.: 733,308

[22] Filed: Oct. 18, 1976

[30] Foreign Application Priority Data

Oct. 13, 1975 [JP] Japan ................................ 50-122563
Oct. 13, 1975 [JP] Japan ................................ 50-122564
Oct. 23, 1975 [JP] Japan ................................ 50-127823

[51] Int. Cl.² .......................................... H02P 1/00
[52] U.S. Cl. ................................. 318/139; 307/72; 307/85
[58] Field of Search ............. 318/139, 229, 230, 231; 363/22, 24, 25, 133; 307/66, 72, 80, 85, 46, 48; 290/4 R

[56] References Cited

U.S. PATENT DOCUMENTS

| | | | |
|---|---|---|---|
| 3,339,080 | 8/1967 | Howald | 363/133 |
| 3,350,620 | 10/1967 | Barron | 363/24 |
| 3,514,681 | 5/1970 | Dorn et al. | 318/139 |
| 3,736,480 | 5/1973 | Lee | 320/59 |
| 3,846,691 | 2/1971 | Higgins | 363/25 |
| 3,986,098 | 10/1976 | Tamii et al. | 307/66 |

Primary Examiner—Robert K. Schaefer
Assistant Examiner—M. K. Mutter
Attorney, Agent, or Firm—Stevens, Davis, Miller & Mosher

[57] ABSTRACT

In an electric power converting apparatus utilized to convert the power of a storage battery into an AC voltage, step up the AC voltage by use of a step up transformer and rectify the secondary voltage of the transformer to directly operate a DC driving motor of a car or an AC motor through an inverter, a rectifier and an inverter are provided to energize the secondary of the transformer from a commercial source and another rectifier is provided on the primary side of the transformer to charge the storage battery.

7 Claims, 4 Drawing Figures

F I G. I

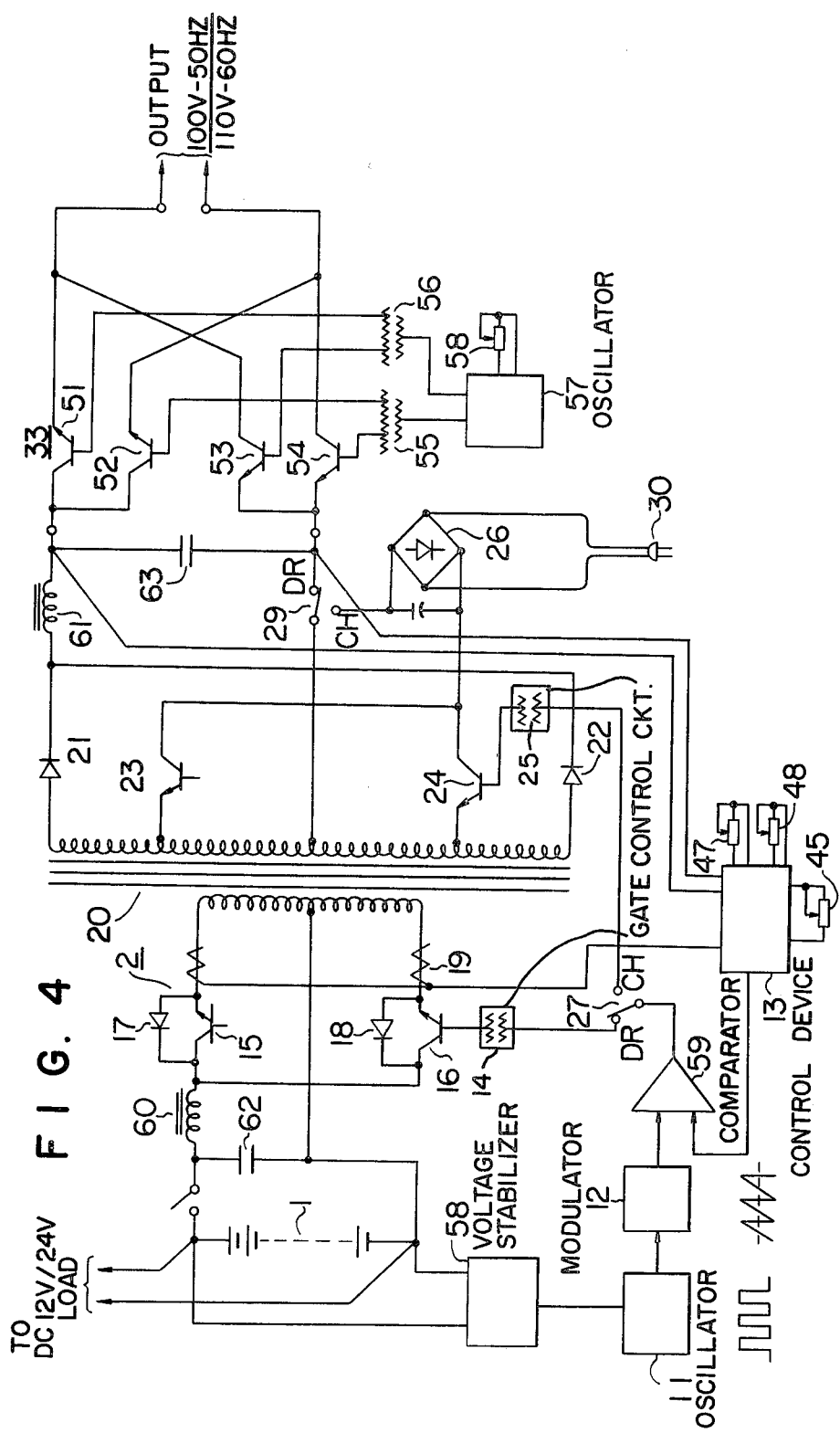

4,131,829

ELECTRIC POWER CONVERTING APPARATUS FOR USE IN BATTERY CARS

BACKGROUND OF THE INVENTION

This invention relates to an electric power converting apparatus for driving a driving motor of a car from a storage battery mounted thereon.

As is well known in the art, in a battery car the DC power of a storage battery is applied directly to a DC driving motor or to an AC driving motor through an inverter which converts direct current into alternating current. In this system all power is supplied from the battery and its capacity and weight are large so that it is necessary to select a reasonable battery. Batteries for use in motor cars generally have a rating of 6 cells and 12 volts.

Since a series connection of batteries is not advantageous, 12 V to 24 V is advantageous for batteries for driving electric motor cars. On the other hand, high voltage is advantageous for the driving motor. For this reason, motor car driving motors generally have a rating of about 10 to 100 KW and 100 to 400 V. In earlier arrangements, the DC voltage of the battery was applied to a DC driving motor, and the battery voltage was selected to be from 48 to 96 V. This system, however, is not satisfactory in view of the operating characteristics and economy. Such an electric car requires a charging facility but as most charging facilities are bulky it is impossible to mount them on the car. Accordingly, the charging facilities are generally installed on the ground. Since a DC motor is not only expensive but also requires troublesome maintenance, a recent trend is the use of an AC motor, particularly an induction motor.

BACKGROUND OF THE INVENTION

It is an object of this invention to provide an improved electric power converting apparatus utilized to operate a driving motor of a car from a battery which can also be used to charge the battery from a source of commercial supply.

Another object of this invention is to provide an improved electric power converting apparatus for use in an electric motor cars capable of driving the driving motor of the car at relatively high voltage from a battery of relatively low voltage at high efficiencies.

According to this invention, there is provided an electric power converting apparatus for use in a battery car of the type comprising a storage battery, a first inverter including first switching elements for converting the DC voltage of the storage battery into an AC voltage, a step-up transformer for stepping up the output AC voltage of the first inverter, and a first rectifier for rectifying the secondary voltage of the step-up transformer, characterized in that there are provided a second rectifier for rectifying the alternating voltage of an external source of commercial supply, a second inverter including second switching elements connected between the secondary winding of the step-up transformer and the output of the second rectifier for converting the output of the second rectifier into an AC voltage for energizing the secondary winding of the step-up transformer, rectifier diodes respectively connected in parallel opposition with the first switching elements of the first inverter for charging the storage battery, and a switching circuit for switching the operations of the first and second inverters.

BRIEF DESCRIPTION OF THE DRAWINGS

In the accompanying drawings:

FIG. 4 shows a connection diagram of another modification suitable for a storage battery having a relatively low voltage.

DESCRIPTION OF THE PREFERRED EMBODIMENTS

Figure 1:
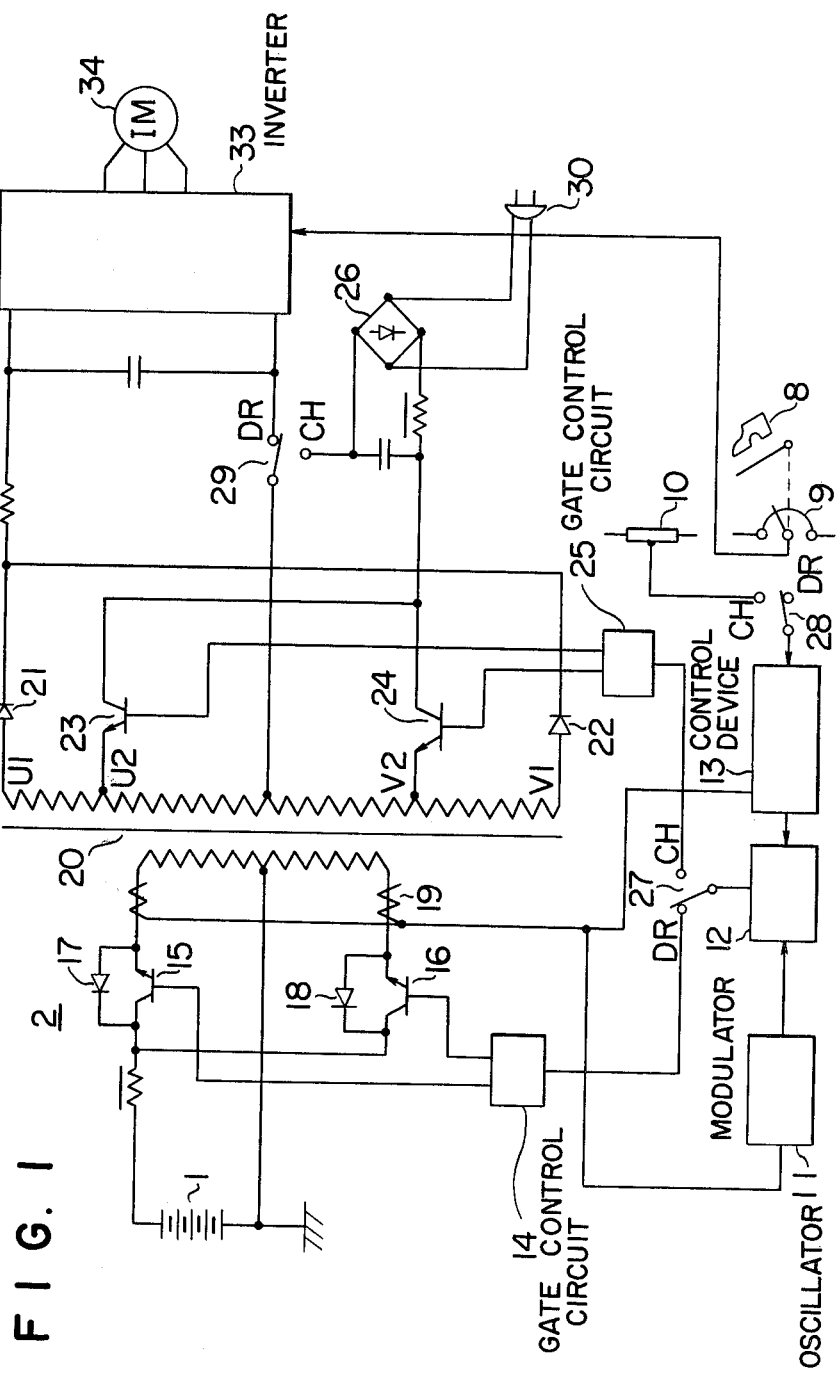
FIG. 1 is a connection diagram showing one embodiment of the electric power converting apparatus embodying the invention.

FIG. 1 is a connection diagram of a preferred embodiment of this invention in which a three phase induction motor 34 is operated by a storage battery 1 by a variable frequency alternating current generated by the electric power converting apparatus constructed in accordance with this invention. The electric power converting apparatus comprises a first inverter 2 consisting of semiconductor switching elements 15 and 16 controlled by a gate control circuit 14 for applying alternating current having substantially constant voltage determined by the voltage of battery 1 across the primary winding of a step-up transformer 20. Although not shown in the drawing, the inverter is provided with a suitable commutating circuit well known in the art. Across the terminate $U_1$ and $V_1$ of the secondary winding is induced a high voltage alternating current of the order of several hundreds volts. This stepped up AC voltage is converted into direct current by a first rectifier, shown as comprising diodes 21 and 22 and the direct current is converted into variable frequency alternating current by a second inverter 33 for driving the motor 34 at a variable speed. The output voltage and frequency of the second inverter 33 is such that the motor 34 produces a torque proportional to the position of a torque setting resistor 9 operated by an acceleration pedal 8, whereby the driving torque of the motor 34 is controlled by the release or of depression of the acceleration pedal 8.

These operations are performed by throwing transfer switches 27, 28 and 29 to the drive side DR, respectively. To charge the battery 1 while the battery car is stopped, these transfer switches are thrown to the charge side CH, respectively and a plug 30 is connected to a source of commercial supply having a rating of 100/110 V, 50/60 Hz, for example.

Then, the power from the source of commercial supply is rectified by a second rectifier 26, and the output thereof is converted into high frequency alternating current by a third inverter comprising semiconductor switching elements 23 and 24 and a commutating circuit, not shown. The voltage of the alternating current is stepped down by the transformer and the voltage induced across the primary winding of the transformer is rectified by a pair of rectifier diodes 17 and 18 which are connected in parallel opposition with the switching elements 17 and 18 to charge the battery 1. The charging current is detected by a current transformer 19 and its output is applied to a control device 13 together with a predetermined set value from a charging current setter 10. The output from an oscillator 11 and the output from the control device 13 are applied to a modulator 12 so as to effect the pulse width control of the third inverter through a gate control circuit 25 thereby charging the battery with a predetermined charging current.

In this manner, the electric power converting apparatus shown in FIG. 1 can provide both functions of variable speed drive of the battery car and charging of the battery with a relatively simple circuit of light weight.

Figure 2:
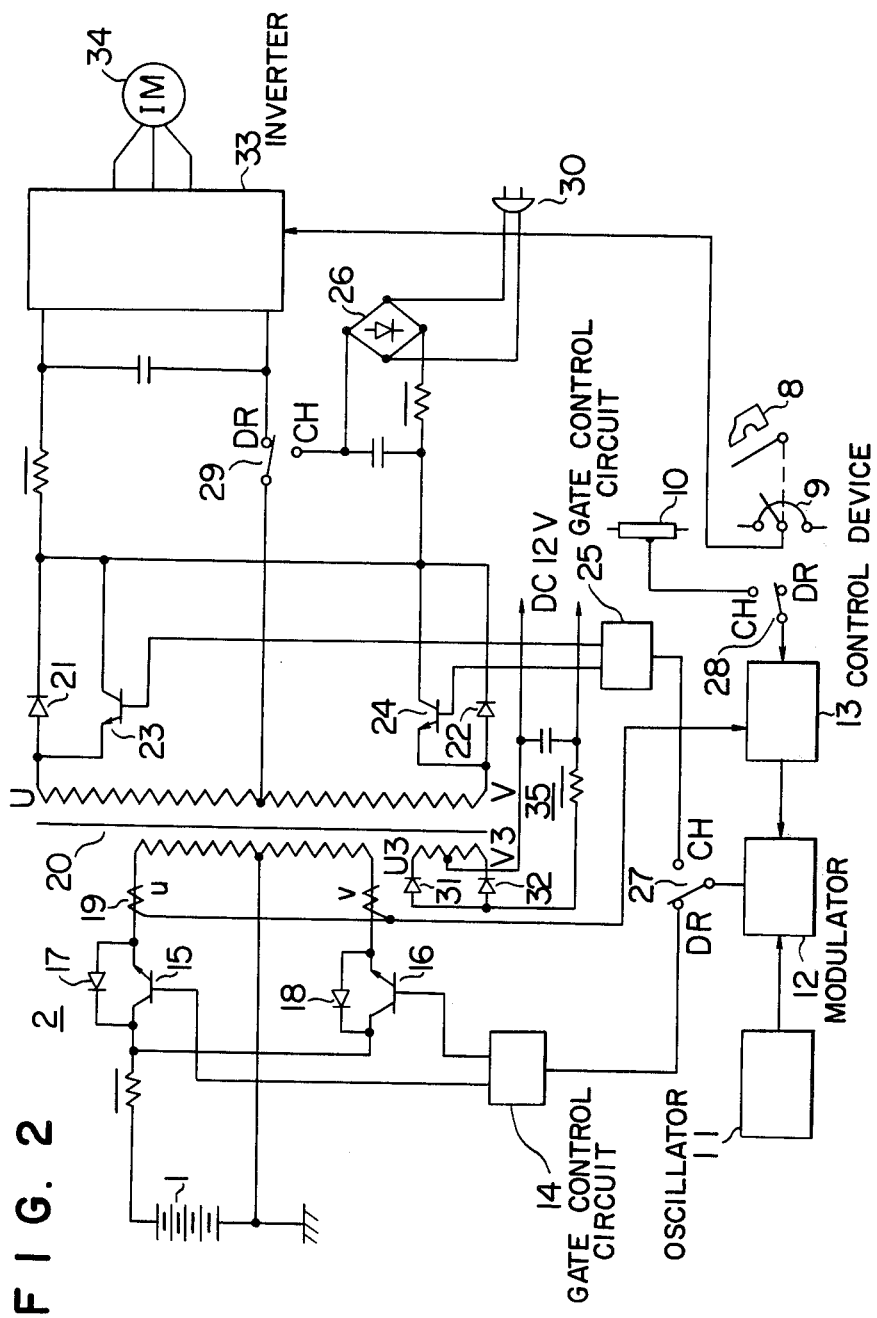
FIG. 2 shows a modified embodiment of this invention.

FIG. 2 shows a modified embodiment of this invention in which circuit elements identical to those shown in FIG. 1 are designated by the same reference numerals. In this embodiment, the input voltage to the second inverter 33 which feeds the induction motor 34 is made to be the same as the DC voltage produced by the second rectifier 26 energized by the source of commercial supply. With this connection, it is possible to use in common the terminals of the secondary winding of the transformer 20 for running and charging so that the running rectifiers 21 and 22 and the switching elements 23 and 24 of the charging inverter can be connected to the same secondary terminals instead of utilizing intermediate terminals as in FIG. 1.

Furthermore, in the embodiment shown in FIG. 2, a third winding is provided for the transformer and its terminals $u_3$ and $v_3$ are connected to diodes 31 and 32 to obtain a low DC voltage, 12 V for example, for energizing auxiliary devices on the car. A filter 35 is connected to smooth out this low DC voltage. Since the first inverter generates substantially constant AC voltage, the voltage induced in the third winding is also constant thereby producing substantially constant low auxiliary DC voltage (12 V) regardless of the running speed of the car.

Figure 3:
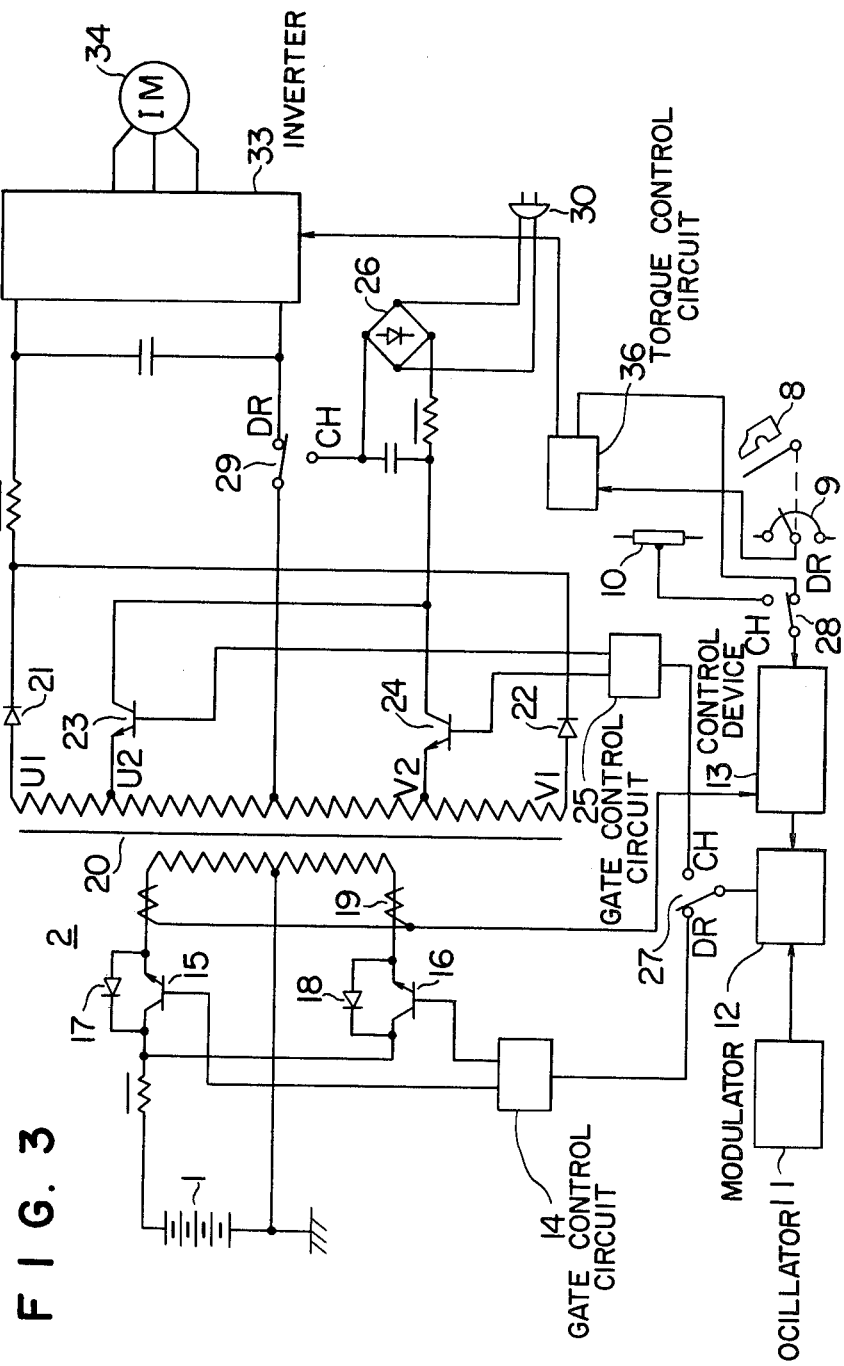
FIG. 3 shows still another embodiment constructed to operate an induction motor by variable voltage variable frequency alternating current.

FIG. 3 shows another modification of this invention modified to drive an induction motor by variable voltage a variable frequency alternating current. The elements shown in FIG. 3 and corresponding to those shown in FIGS. 1 and 2 are designated by the same reference numerals. In the embodiments shown in FIGS. 1 and 2, the switching elements 15 and 16 are shown to be controlled by gate control circuit 14. In the embodiment shown in FIG. 3, a torque control circuit 36 is added, which is controlled by a torque setting variable resistor 9 actuated by an acceleration pedal 8. The output of the torque control circuit is applied to the second inverter 33 to control the frequency of the alternating current supplied to motor 34. At the same time, the output of the torque control circuit 36 is supplied to gate control circuit 14 of the first inverter 2 via transfer switches 27 and 28, control device 13 and modulator 12 so as to provide a pulse width control of the first inverter, thereby varying the effective voltage supplied to the primary winding of transformer 20. In this manner, the voltage and frequency of the alternating current supplied to the induction motor 34 are controlled by the acceleration pedal 8, whereby the speed and torque of the motor can be controlled as desired without power loss.

Although in the foregoing embodiments an induction motor was used for driving the battery car and an inverter 33 was used to convert the output of the first rectifier into variable frequency alternating current, in certain cases a DC driving motor can be directly energized by the output from the first rectifier.

Further, in the embodiment shown in FIG. 2, the battery has a relatively high terminal voltage, 48 to 96 V for example, and for this reason, a third winding and rectifying diodes 31 and 32 were provided for producing 12 V DC voltage for operating various auxiliary devices of the car such as lamps, a radio, a starting motor, wiper, etc.

FIG. 4 is another modification of this invention which is suitable to a battery car wherein the storage battery has a relatively low terminal voltage for example 12 V or 24 V and is used to supply driving power to the driving motor of the car and various auxiliary devices designed to operate at 12 V or 24 V, DC. Further, FIG. 4 shows in more detail the construction and operation of the first and second inverters. The general construction and operation of the embodiment shown in FIG. 4 is similar to those of the embodiment shown in FIG. 1 so that identical elements are designated by the same reference numerals to simplify the description.

In this embodiment, the semiconductor switching elements 15 and 16 of the first inverter 2 are controlled by oscillator 11 and control device 13 through transfer switch 27 in the same manner as in FIG. 1. More particularly, the oscillator 11 is energized by battery 1 through a voltage stabilizer 58 to produce a rectangular wave which is shaped into a saw tooth wave by the modulator 12. Between the modulator 12 and the control device 13 is connected a comparator 59 and the contact DR of the transfer switch 27 is connected to the base electrodes of the switching elements 15 and 16 (only one is shown) through a gate control circuit 14. The control device 13 is energized by the DC voltage produced by rectifier diodes 21 and 22 and provided with a voltage setting resistor 45 for effecting a pulse width control of the switching elements 15 and 16 for maintaining constant secondary voltage regardless of the variation in the secondary load of the transformer 20, a maximum discharge current limiting resistor 47 and a maximum charging current limiting resistor 48.

The inverter 33 comprises semiconductor switching elements 51, 52, 53 and 54 which are connected in a bridge configuration to produce alternating current of 100 V, 50 Hz or 110 V, 60 Hz or any other variable voltage variable frequency alternating current. These switching elements are ON OFF controlled by an oscillator 57 through control transformers 55 and 56. The oscillation frequency of the oscillator 57 is controlled by a resistor 58. Reactors 60 and 61 and capacitors 62 and 63 which constitutes filters are provided for rectifier diodes 17, 18, 21 and 22.

As above described, this invention provide a compact and light weight electric power converting apparatus for use in a battery car which can operate a DC or AC driving motor of the car and can readily charge the battery.

I claim:

1. In an electric power converting apparatus for use in a battery car of the type comprising a storage battery, a first inverter including first switching elements for converting the DC voltage of said storage battery into an AC voltage, a step up transformer including primary and secondary windings for stepping up the output AC voltage of said first inverter, a first rectifier for rectifying the secondary voltage of said step up transformer, a second rectifier for rectifying the alternating voltage of an external source of commercial supply, a third inverter including second switching elements connected between the secondary winding of said step up transformer and the output of said second rectifier for converting the output of said second rectifier into an AC voltage for energizing the secondary winding of said step up transformer, and a switching circuit for switching the operations of said first and second inverters, the improvement which comprises rectifier diodes respectively connected directly in parallel opposition with said first switching elements of said first inverter for charging said storage battery and wherein said third inverter is connected to the same secondary winding of said transformer as said first rectifier, said rectifier diodes being connected to the same primary winding of said transformer as said first inverter.

2. The electric power converting apparatus according to claim 1 which further comprises a second inverter for converting the output of said first rectifier into a variable frequency alternating voltage utilized to energize an AC driving motor of said car.

3. The electric power converting apparatus according to claim 1 wherein the output of said third inverter is connected across the terminals of the secondary winding of said step up transformer.

4. The electric power converting apparatus according to claim 1 wherein said secondary winding is provided with intermediate taps, and the output of said third inverter is connected across said intermediate taps.

5. The electric power converting apparatus according to claim 1 wherein said step up transformer is provided with a third winding for producing an voltage different from the output voltage of said first inverter, and said electric power converting apparatus further comprises a third rectifier-connected to rectify the AC voltage of said third winding.

6. The electric power converting apparatus according to claim 1 wherein said first switching elements comprise gate controlled semiconductor switching elements and said apparatus further comprises a gate control circuit for said first switching elements for controlling the output AC voltage of said first inverter.

7. The electric power converting apparatus according to claim 6 wherein said gate control circuit is controlled by an acceleration pedal of said car.

* * * * *